(12) United States Patent
Godager (10) Patent No.: US 8,561,890 B2
(45) Date of Patent: Oct. 22, 2013

(54) SYSTEM AND METHOD FOR MONITORING COMMERCIAL TRANSACTIONS

(75) Inventor: Sindre Godager, Bergen (NO)

(73) Assignee: Acquire AS (NO)

( * ) Notice: Subject to any disclaimer, the term of this patent is extended or adjusted under 35 U.S.C. 154(b) by 0 days.

(21) Appl. No.: 13/319,271

(22) PCT Filed: May 5, 2010

(86) PCT No.: PCT/NO2010/000167
§ 371 (c)(1),
(2), (4) Date: Nov. 7, 2011

(87) PCT Pub. No.: WO2010/128865
PCT Pub. Date: Nov. 11, 2010

(65) Prior Publication Data
US 2012/0048922 A1   Mar. 1, 2012

(30) Foreign Application Priority Data

May 7, 2009   (NO) .................................. 20091814

(51) Int. Cl.
*G06Q 40/00* (2012.01)
*G07D 11/00* (2006.01)
*G07F 19/00* (2006.01)

(52) U.S. Cl.
USPC ............ 235/379; 235/375; 235/487; 235/380

(58) Field of Classification Search
USPC ............. 235/379, 375, 487, 380, 492; 705/39
See application file for complete search history.

(56) References Cited

U.S. PATENT DOCUMENTS

| 2004/0088238 A1 | 5/2004 | Gilson et al. |
| 2006/0064379 A1 | 3/2006 | Doran et al. |
| 2007/0164106 A1 | 7/2007 | McDevitt et al. |
| 2008/0086414 A1 | 4/2008 | Ching |

FOREIGN PATENT DOCUMENTS

WO   2006121989 A2   11/2006

OTHER PUBLICATIONS

International Search Report for PCT/NO2010/000167, Completed by the Nordic Patent Office on Jul. 29, 2010, 2 Pages.

*Primary Examiner* — Edwyn Labaze
(74) *Attorney, Agent, or Firm* — Brooks Kushman P.C.

(57) ABSTRACT

A system for monitoring commercial transactions is implemented using credit cards and/or debit cards in conjunction with card readers and/or their associated cash registers linked in communication to a banking establishment. The system comprises modules for use with printers of the card readers and/or their associated cash registers for communicating information included in receipts generated in response to transactions occurring in respect of the credit cards and/or debit cards executed at the card readers. The system further includes computing hardware executing in operation software products for receiving information included in the receipts, for receiving from the banking establishment account information regarding owners or users of the credit cards and/or debit cards, and for associating information included within the receipts with the account information to generate a detailed itemized report of individual items provided in the receipts for presentation to the owners or users.

20 Claims, 7 Drawing Sheets

SYSTEM AND METHOD FOR MONITORING COMMERCIAL TRANSACTIONS

CROSS-REFERENCE TO RELATED APPLICATION

This application is the U.S. national phase of PCT Appln. No. PCT/NO2010/000167 filed May 5, 2010 which claims priority to Norwegian application 20091814 filed May 7, 2009, the disclosures of which are incorporated in their entirety by reference herein.

FIELD OF THE INVENTION

The present invention relates to systems for monitoring commercial transactions, the systems using specially adapted apparatus. Moreover, the present invention also concerns methods of using these systems. Furthermore, the present invention relates to software products stored on machine-readable media and executable on computing hardware for implementing the methods. Additionally, the invention concerns modules which can be used in conjunction with conventional apparatus for adapting the apparatus to operate with systems pursuant to the present invention.

BACKGROUND OF THE INVENTION

Payment using credit cards and debit cards has become commonplace throughout many regions of the World, for example as the World moves progressively towards a cashless society to employ a Worldwide currency issued by a World bank controlled by a World government. Such cards avoid people having to carry large amounts of cash with them which can be both dangerous and inconvenient. Moreover, the use of these cards by their owners allows for automatic generation of bank statements informing the owners of available balances within their respective bank accounts. However, bank statements only disclose the identity of organisations to which payments have been made and a total magnitude of payments made to the organisation, and not specific items which have been purchased within each commercial transaction. Such lack of information often renders it difficult for credit card and debit card owners to plan their expenditure based upon such bank statements.

It is envisaged with multiple coincidences of "peak oil", a burgeoning World population, a depletion of natural resources, anthropogenically-induced climate change and an end of easy credit that living standards of most people in the World will reduce in coming years. A problem therefore arises for tools and facilities to enable people to budget more effectively so that their diminishing financial resources are utilized in a most appropriate manner.

In a published United States patent application US 2004/0088238 A1 (Gilson et al.), there is described a method and system for monitoring electronic transactions, for example credit card transactions, for determining whether or not associated transaction costs, such as interchange fees, are being properly qualified. Such proper qualification is accomplished by monitoring for a "spike" in interchange qualification and generating an alert when one or more "spikes" are detected. "Spikes" in interchange qualifications are defined as a variation in interchange qualifications compared with an historic level. Technology described in this patent application is concerned with a problem of monitoring transaction costs.

In a published United States patent application US 2006/0064379 A1 (Doran et al.), there are described methods and systems for exchanging various forms of value, including coins, currency, credit, debit and/or bank account funds, for prepaid cash cards, credit cards, phone cards, and the like. A value exchange machine is described which includes a coin input region, a coin sorting/counting apparatus, a card reader, and a communications facility configure to communicate with a remote computer network. Alternatively, a value exchange system is described which includes one or more value exchange machines connected to one or more remote computers via a communication link.

Security problems in connection with Internet banking have been previously reported, for example hackers gaining access to bank account details and so forth (Kalakota and Whinston, 1997). Such hacking can include password "sniffing". For reducing a risk of credit card fraud, a SET-system has been proposed which employs a specification developed by VISA and MasterCard in collaboration with Netscape, Microsoft and IBM. In the SET-system, four parties are operable to exchange data: a buyer, a seller, a certifying authority and a bank. A presumption to a financial transaction is that the seller and buyer are certified. A financial transaction is implemented by the buyer and the seller "fining" one another via the Internet. The seller's bank automatically sends information regarding the purchaser's bank account number which is checked to ensure that there are adequate associated funds for implementing a purchase. The transaction is then authorized and a payment transfer is made between the buyer and the seller. The SET-system is an open system and can be freely used by any party desirous to implement a financial transaction via Internet. A disadvantage of the SET-system is a relatively large number of communication interactions required to execute a transaction which can add costs which the buyer and/or seller must bear. The SET-system has been in use since the year 2000.

SUMMARY OF THE INVENTION

The present invention seeks to provide a system which is capable of enabling users to receive more detailed and clear records of their bank account payments, the system being susceptible to being implemented in combination with existing established credit card and/or debit card payment apparatus.

According to a first aspect of the present invention, there is provided a system as claimed in appended claim 1: there is provided a system for monitoring commercial transactions implemented using one or more credit cards and/or debit cards in conjunction with one or more card readers and/or their associated cash registers linked in communication to a banking establishment, characterized in that the system comprises one or more modules for use with one of more printers of the one or more card readers and/or their associated cash registers for communicating information included in receipts generated in response to transactions occurring in respect of the one or more credit cards and/or debit cards executed at the one or more card readers and/or their associated cash registers, the system further including computing hardware executing in operation one or more software products for receiving information included in the receipts, for receiving from the banking establishment account information regarding one or more owners or users of the one or more credit cards and/or debit cards, and for associating information included within the receipts with the account information to generate a detailed itemized report of individual items provided in the receipts for presentation to the one or more owners or users.

The invention is of advantage in that the system enables detailed itemized reports of individual items present in receipts to be provided to the one or more owners.

Optionally, when implementing the system, the one or more modules are adapted to be connected between the one or more card readers and/or their associated cash registers, and their associated one or more printers.

Optionally, when implementing the system, the one or more modules are operable to generate the information included in the receipts for communicating to the computing hardware by optically imaging paper receipt documents printed by the one or more printers.

Optionally, when implementing the system, the one or more modules are adapted to be integral to the one or more card readers and/or their associated one or more cash registers and/or their associated one or more printers.

Optionally, when implementing the system, the computing hardware is operable to associate the information included in the receipts with the account information by:
(a) comparing a subset of account identification digits included in the receipts with account numbers included in the account information; and at least one of:
(b) comparing times of transaction recorded on the receipts with time records present in the account information; and
(c) comparing total amounts debited for each transaction as recorded on the receipts and also present in the account information.

Optionally, when implementing the system, the detailed itemized report of individual items provided in the receipts for presentation to the one or more owners or users includes the individual items allocated to one or more categories of items. More optionally, the system is operable to provide the itemized report relating to a defined time interval in which the receipts were generated.

Optionally, when implementing the system, the computing hardware is provided by way of a web server linked to the Internet.

According to a second aspect of the invention, there is provided a method of using a system to monitor commercial transactions implemented using one or more credit cards and/or debit cards in conjunction with one or more card readers and/or their associated cash registers linked in communication to a banking establishment, characterized in that the method includes:
(a) communicating information included in receipts using one or more modules, the one or more modules being adapted for use with one of more printers of the one or more card readers and/or their associated cash registers, the receipts being generated in response to transactions occurring in respect of the one or more credit cards and/or debit cards executed at the one or more card readers and/or their associated cash registers; and
(b) using computing hardware executing in operation one or more software products to receive information included in the receipts, to receive from the banking establishment account information regarding one or more owners or users of the one or more credit cards and/or debit cards, and to associate information included within the receipts with the account information to generate a detailed itemized report of individual items provided in the receipts for presentation to the one or more owners or users.

Optionally, when implementing the method, the one or more modules are adapted to be connected between the one or more card readers and/or their associated cash registers, and their associated one or more printers.

Optionally, when implementing the method, the one or more modules are adapted to be integral to the one or more card readers and/or their associated one or more cash registers and/or their associated one or more printers.

Optionally, when implementing the method, the one or more modules are operable to generate the information included in the receipts for communicating to the computing hardware by optically imaging paper receipt documents printed by the one or more printers.

Optionally, when implementing the method, the computing hardware is operable to associate the information included in the receipts with the account information by:
(a) comparing a subset of account identification digits included in the receipts with account numbers included in the account information; and at least one of:
(b) comparing times of transaction recorded on the receipts with time records present in the account information; and
(c) comparing total amounts debited for each transaction as recorded on the receipts and also present in the account information.

Optionally, when implementing the method, the detailed itemized report of individual items provided in the receipts for presentation to the one or more owners includes the individual items allocated to one or more categories of items. More optionally, when implementing the method, the system is operable to provide the itemized report relating to a defined time interval in which the receipts were generated.

Optionally, when implementing the method, the computing hardware is provided by way of a web server linked to the Internet.

According to a third aspect of the invention, there is provided a module as claimed in appended claim 19: there is provided a module for connecting in a data stream between a card reader and its associated printer for receiving receipt information and sending the receipt information via a data link to computing hardware remote from the card reader, the module being adapted for implementing a method pursuant to the second aspect of the invention.

Optionally, the module is adapted for being integrally incorporated within said associated printer and/or said card reader.

Optionally, the module is adapted to be a cradle for coupling to the cash register, wherein the cradle is provided with a bi-directional communication link to the computing hardware, and wherein the cradle includes a display arrangement for presenting information personalized to the one or more owners or users when utilizing the cash register to make payment.

According to a fourth aspect of the invention, there is provided a software product recorded on a machine readable medium, the software product being executable upon computing hardware for implementing a method pursuant to the second aspect of the invention.

It will be appreciated that features of the invention are susceptible to being combined in any combination without departing from the scope of the invention.

DESCRIPTION OF THE DIAGRAMS

Embodiments of the present invention will now be described, by way of example only, with reference to the following diagrams wherein.

In the accompanying diagrams, an underlined number is employed to represent an item over which the underlined number is positioned or an item to which the underlined number is adjacent. A non-underlined number relates to an item identified by a line linking the non-underlined number to the item. When a number is non-underlined and accompanied by an associated arrow, the non-underlined number is used to identify a general item at which the arrow is pointing.

DESCRIPTION OF EMBODIMENTS OF THE INVENTION

Figure 1:
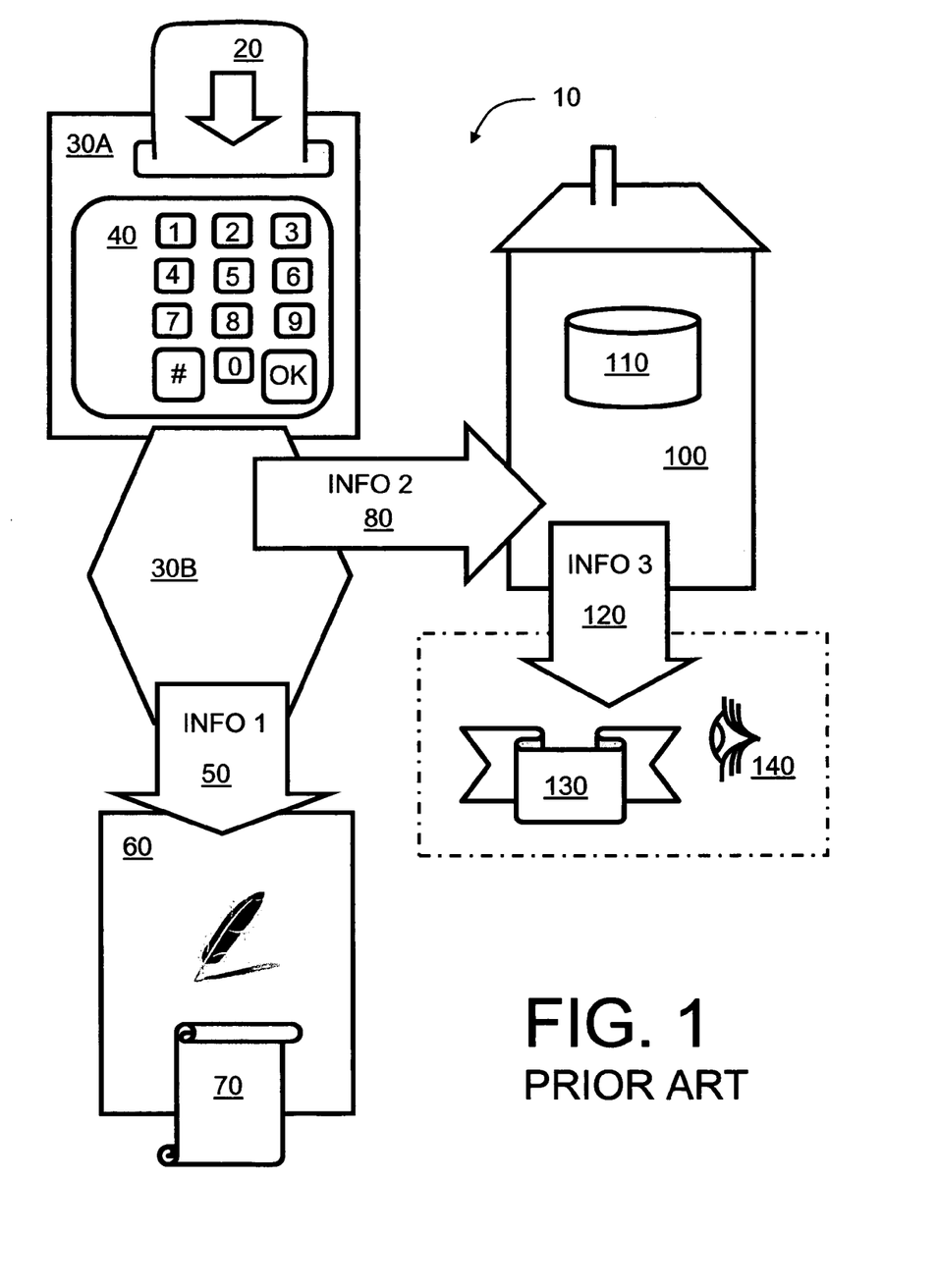
FIG. 1 is an illustration of a known credit card or debit card financial system for use when executing purchases at retailing premises.

Referring to FIG. 1, there is shown a known credit card or debit card financial system for use when executing purchases at retailing premises; the system is indicated generally by 10. The system 10 includes a card reader 30A linked to a cash register 30B. The card reader 30A is operable to receive a credit card or debit card denoted by 20. The card reader 30A also includes a keyboard 40 at which an owner 140 of the card 20 is able to input a personal identity number (PIN) code when authorizing financial transactions from a bank account associated with the credit card or debit card 20. Coupled to the card reader 30A and/or the cash register 30B is a printer 60 for printing paper receipts 70 based upon a first data stream 50 (INFO 1) from the card reader 30A and/or the cash register 30B; optionally, the printer 60 is a thermal printer operable to print onto thermal paper to provide the paper receipts 70. The printer 60 is beneficially coupled via a standard RS232 link to the card reader 30A and/or the cash register 30B. The card reader 30A and cash register 30B are, for example, conveniently coupled to a laser bar-code reader and stock control arrangement of commercial premises at which the card reader 30A and the cash register 30B are installed. The printed paper receipts 70 each include following information:

(a) at least a subset of digits of the owners credit card or debit card 20;
(b) word identifications, for example abbreviations or acronyms, describing a nature of purchased products;
(c) cost of individual purchased products;
(d) a total cost of the transaction; and
(e) a time at which the transaction was executed.

The receipts 70 deliberately do not include sufficient information for a third party to gain access to bank accounts of the owner 140. However, the receipts 70 provide the owner 140 with an indication of an amount of money that has been debited in relation to goods or services sold to the owner 140.

Via a standard integrated services digital network (ISDN) 80, the card reader 30A and the cash register 30B are operable to supply an identity of the card 20 and the four-digit PIN code entered by the owner 140 at the keyboard 40 of the card reader 30A as a second data stream (INFO 2) to a banking establishment 100; the banking establishment 100 stores such details in its financial transaction database 110. The banking establishment 100 beneficially includes two components: one or more credit card data clearing establishments and one or more banks; an example of a credit card clearing establishment is BBS in Norway. The banking establishment 100 is operable, either by a printed account sent in paper form by letter post to the owner 140 or by Internet access by the owner 140 to his/her account details hosted by the banking establishment 100, to provide a regular report of the owner's personal account with the banking establishment 100. It is the owner's responsibility to check that the regular report correlates with the printed paper receipts 70 to ensure that they are correct and that incorrect debiting has not occurred. By various legal arrangements, for protection of personal data legislation, the banking establishment 100 is limited in the information which it can correlate on financial behavior of the owner 140.

By this known arrangement in FIG. 1, a third party obtaining a copy of the receipt 70 is not able to gain sufficient information to gain access to the owner's account at the banking establishment 100. Moreover, a third party hacking into the banking establishment 100 is not able to obtain a detailed record of purchasing habits of the owner 140 as recorded on the receipts 70.

Figure 6:
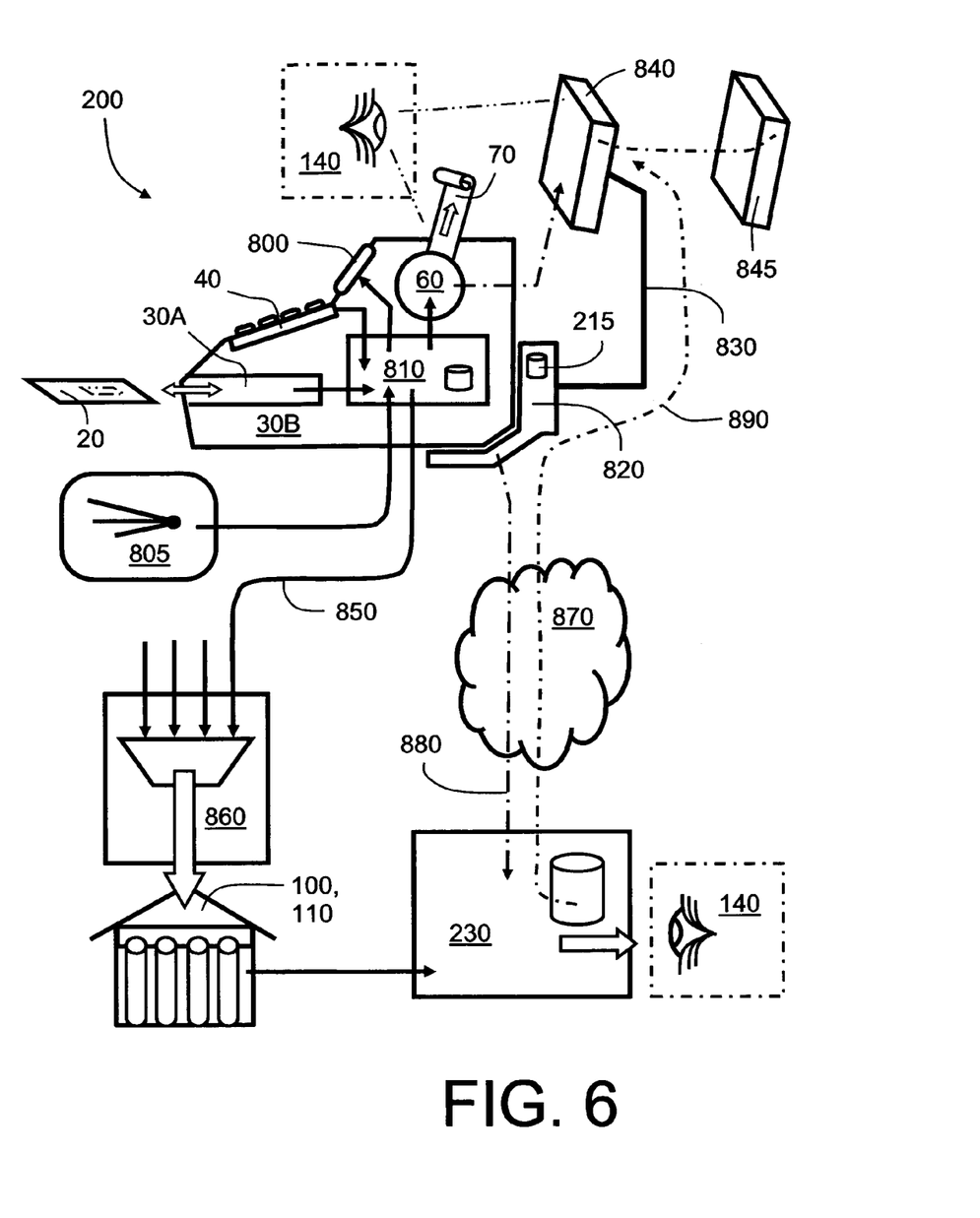
FIG. 6 is an illustration of an alternative system for monitoring financial transactions pursuant to the present invention, wherein the system employs a bi-directional "Duotube" data flow configuration.

The inventors have appreciated that the financial system 10 illustrated in FIG. 1 is susceptible to being adapted to provide an enhanced service to the owner 140 as well as functioning as a tool to assist the owner 140 to plan budgets carefully in view of a future economically-contracting World in which resources will become progressively scarce. Such adaptation of the system 10 to provide additional functionality can be achieved by retrofitting additional components to the system 10 without fundamentally needing to modify the system 10. Optionally, the additional components are integrally incorporated into the system 10, for example at original manufacture thereof or retrofitted thereto, for adapting the system 10 pursuant to the present invention, For example, FIG. 6 is an illustration of the system pursuant to the present invention implemented by retrofitting components to existing credit card reading apparatus.

Figure 2:
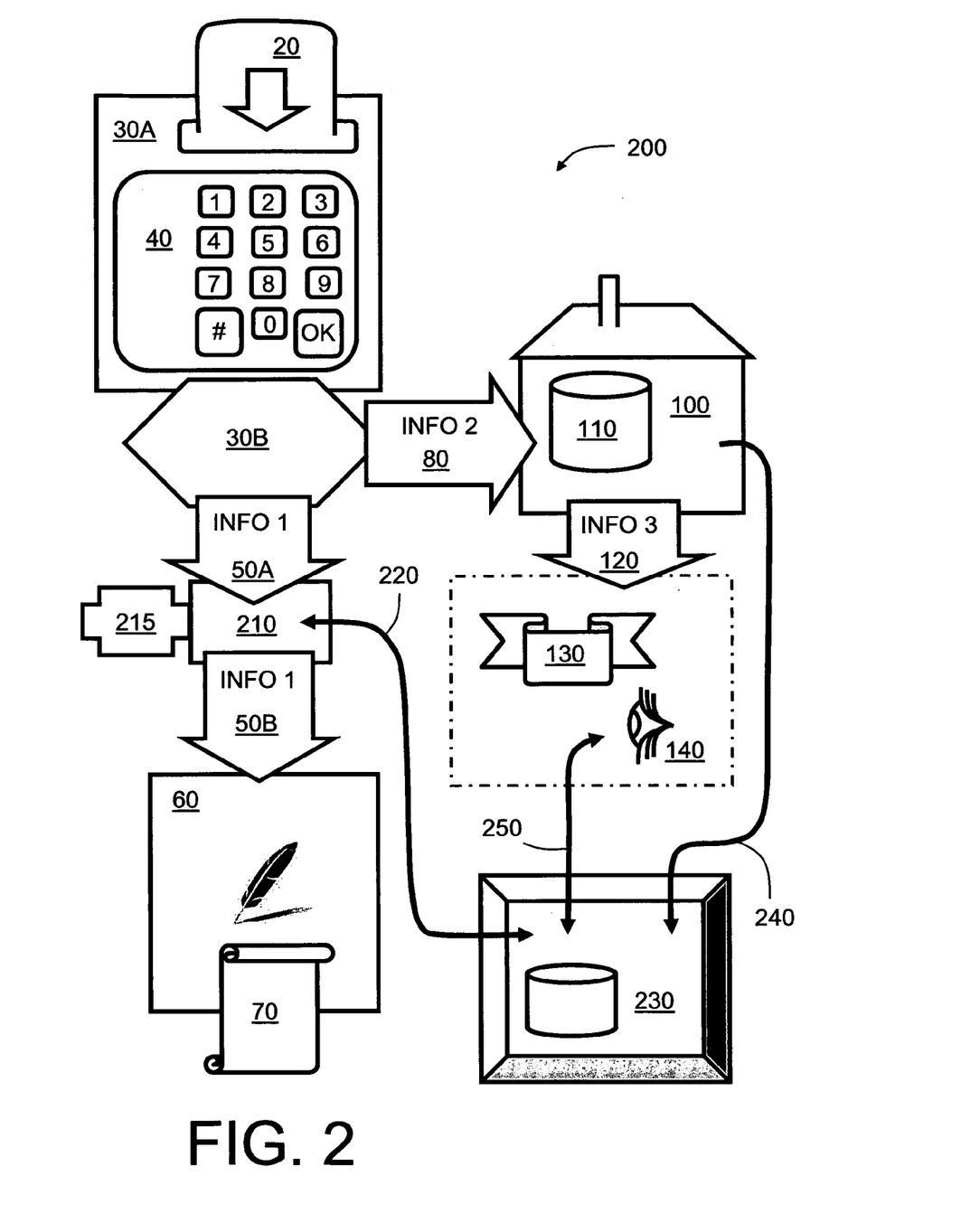
FIG. 2 is an illustration of a system for monitoring financial transactions pursuant to the present invention.

A first embodiment of a financial system pursuant to the present invention is indicated generally by 200 in FIG. 2. The system 200 includes one or more card readers 30A for receiving one or more credit cards or debit cards 20 from one or more owners 140, namely users. Each card reader 30A includes an associated keyboard 40 for the one or more owners 140 to enter their respective PIN codes corresponding to their cards 20 when authorizing financial transactions from bank accounts associated with their cards 20. The system 200 further includes a module 210 connected in operation between the card reader 30A and/or its associated cash register 30B and the printer 60 as illustrated. The module 210 includes one or more processors and a data memory 215 including software and providing working data memory for the one or more processors. The module 210 includes a first communication port 50A for coupling to the card reader 30A and/or the cash register 30B for receiving the first data stream (INFO 1); beneficially, the first data stream (INFO 1) is provided in a standard RS232 data format, although alternative formats can be optionally employed. Moreover, the module 210 includes a second communication port 50B whereat the first data stream (INFO 1) is relayed to the printer 60 for printing the receipts 70. The module 210 further includes a third port 220 for providing an output data stream for providing receipt data, for example in encrypted manner, to an Internet web site 230. The third port 220 and its associated data link from the module 210 to the Internet web site 230 hosted at a server can be implemented via optical fibre, via wireless or by wire coupling, for example, depending upon circumstances. Wireless communication is especially desirable because involves installation of less infrastructure when retrofitting the system 200. The third port 220 is beneficially operable to support bidirectional data flow therethrough for enabling the web site 230 to receive data from the module 210 as well as interactively requesting specific data to be provided from the module 210. Moreover, such bidirectional communication via the third port 220 also enables software of the module 210 to be dynamically updated. Such bi-directional communication is referred in respect of the present invention as being a "Duotube". Optionally, the data memory 215 has considerable data storage capacity, for example several Gbytes data storage capacity, so that data flow interruption of the third port 220 does not result in the system 10 malfunctioning but merely a delay in reporting occurring; images or representations of the receipts 70 are beneficially stored in the data memory 215. Yet more optionally, data flow occurring via the third port 220 is encrypted to ensure data security. The module 210 is operable to receive in the first data stream 50A including alphanumerical characters to be printed by the printer 60, and to convert them to XML and/or pdf-format representations of the receipts 70 to be printed out by the printer 60; "pdf" format is an acronym for "portable document format" associated with contemporary Adobe browser proprietary software. "XML" is an acronym corresponding to "eXtensible Markup Language". These XML and/or pdf-format representations are communicated via the third port 220 to the Internet web site 230. The module 210 is an inexpensive mass-produced device or unit supplied to retailing premises for retrofitting to their card readers 30A without a need for the card readers 30A and/or their associated one or more cash registers 30B to be modified in any manner, thereby allowing for convenient retrofitting of the module 210 to existing card readers 30A and/or their associated cash registers 30B. Alternatively, the module 210 can be integrated into one or more of the card readers 30A and/or into their associated cash registers 30B and/or into their associated printers 60.

Operators of the web site 230 have previously contractually arranged with the banking establishment 100 to provide in a third data stream via a secure data link 240 account details of owners 140, namely users, who have subscribed to services provided by the web site 230 and thereby given permission for the banking establishment 100 to provide their account transaction details to the web site 230. Information provided via the data link 240 includes, for each subscribing owner's account, time instances when various credit or debit card transactions approved by the subscribing owner 140 have been executed, and a total amount of money paid for each transaction, but is devoid of any detailed information regarding products purchased within each transaction. Such information is only included on the aforementioned receipts 70 provided solely to the owner 140, namely user.

The web site 230 is, for example, hosted at an Internet server. In operation, the web site 230 stores copies of receipts 70 from various modules 210 coupled in communication with the web site 230, for example as pdf-files and/or XML files. In operation, the web site 230 is operable to pair entries in information provided by the banking establishment 100 with entries in receipt information provided from the modules 210.

Such pairing is beneficially achieved by comparing time signatures $t_{R(i)}$ and partial account numbers $\Delta N(i)$ of receipts i against time signatures $t_{F(j)}$ and full account numbers $N(j)$ of data entries in account details provided to the web site 230 from the banking establishment 100. Pairing occurs when the partial account numbers $\Delta N(i)$ occur in the full numbers $N(j)$ and also that the time signatures $F(j)$, $t_{F(j)}$ are identical to within a defined time error margin. Beneficially, the time error margin is made smaller than 30 minutes, more preferably less than 10 minutes.

Alternatively, pairing occurs when the partial account numbers $\Delta N(i)$ occur in the full numbers $N(j)$ and also that total sums $S_{R(j)}$ debited from the owner's account as shown on the data stream 220 correlate to within an error margin with the total sums $S_{B(j)}$ debited against a given transaction in information provided in the third data stream via the data link 240.

Yet alternatively, pairing occurs when the partial account numbers $\Delta N(i)$ occur in the full numbers $N(j)$, when total sums $S_{R(j)}$, $S_{B(j)}$ in the data streams 220, 240 correspond, and the time signatures $F(j)$, $t_{F(j)}$ for the transaction are identical to within a defined time error margin. Beneficially, the time error margin is less than 30 minutes, more preferably less than 10 minutes.

In an event of such pairing being identified by applications software executing at the web server providing the web site 230, the web site 230 is able to provide the owner 140, namely user, with a detailed breakdown of all his/her credit and/or debit card transactions together with a detailed account of the products and/or services purchase within each transaction.

Moreover, if required, the web server 230 is able to provide additional analysis functions beyond such detailed reporting.

Figure 3:
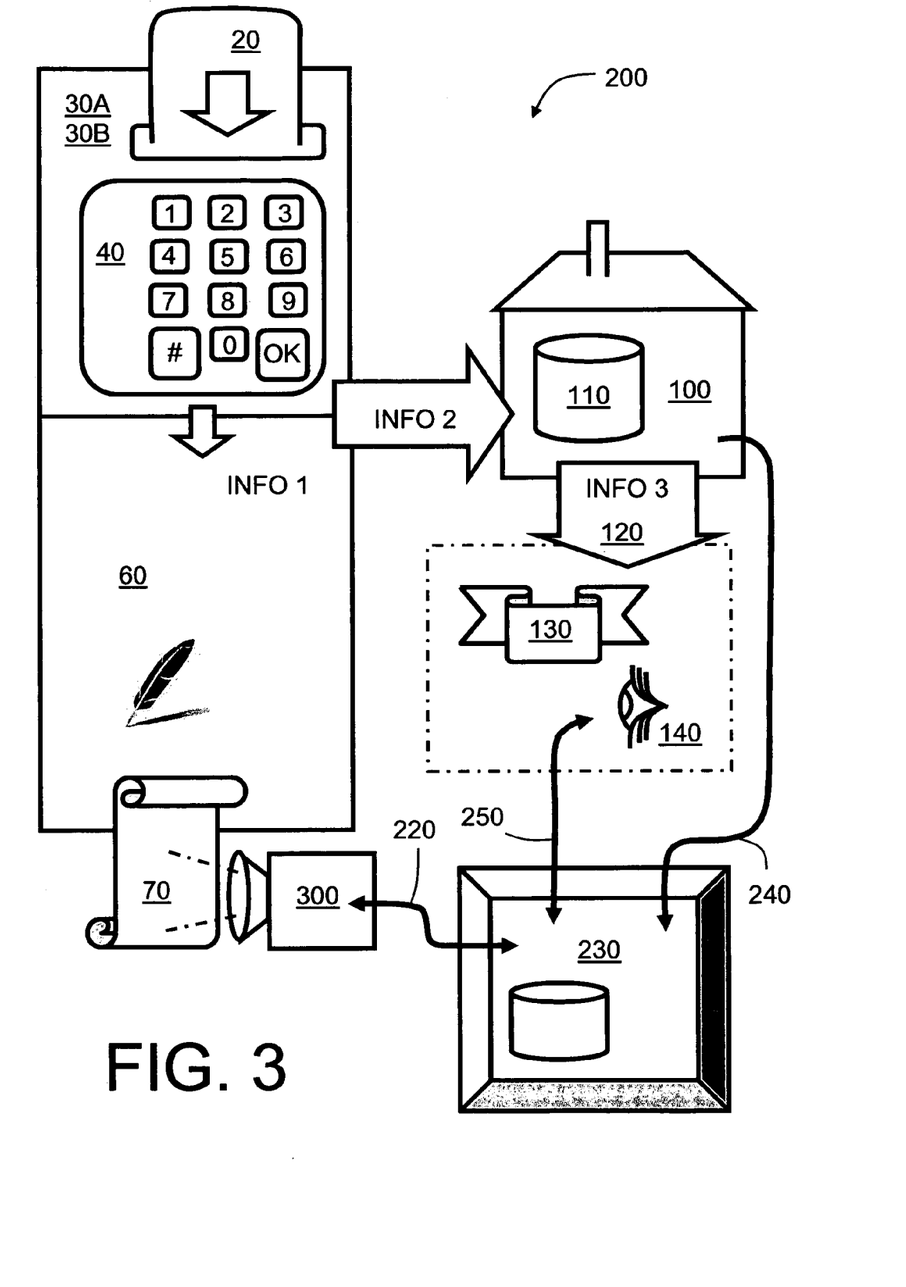
FIG. 3 is an illustration of an alternative system for monitoring financial transactions pursuant to the present invention.

Referring next to FIG. 3, situations can arise where the printer 60 is integrated into the card reader 30A as a single unit such that it is not possible to couple the module 210 as illustrated in FIG. 2. In such a situation, the module 210 is modified to include an optical sensor to provide an attachment module denoted by 300. The attachment module 300 is operable optically to read the receipt 70 when it is printed onto paper to generate a corresponding image which is provided in the first data stream 220 to applications software executing at the web site 230. Optionally, the module 300 is hardware piggy-backed onto the card reader 30A and its integrated printer, for example as illustrated in FIG. 6. By using character recognition software at the web site 230, the optically scanned receipts 70 can be converted into equivalent pdf-format and/or XML format files at the web site 230 for pairing operations as aforementioned. Of significance in FIG. 2 and FIG. 3 is that information which is to be included, or is included, on the receipts 70 are communicated via the first data stream 220 to the web site 230. Optionally, the attachment module 300 is integrally incorporated into the printer 60, for example at original manufacture or by way of an integrated retrofit.

The web site 230 is operable to implement aforementioned one or more software applications, for example prepared in Java, html mark-up language and so forth, to provide the owners 140, namely users, with additional services. Owners 140 of banking cards and corresponding accounts, namely users, having restricted access to the web site 230 using their unique access code words provided to them by the web site 230 or a party authorized by the web site to issue access code words. Owners 140 are normally only able to monitor their own bank account details at the web site 230. Exceptionally, permission may be given for one owner 140 to view the account of another owner 140, for example parents checking financial transactions occurring in their children's bank accounts.

Figure 4:
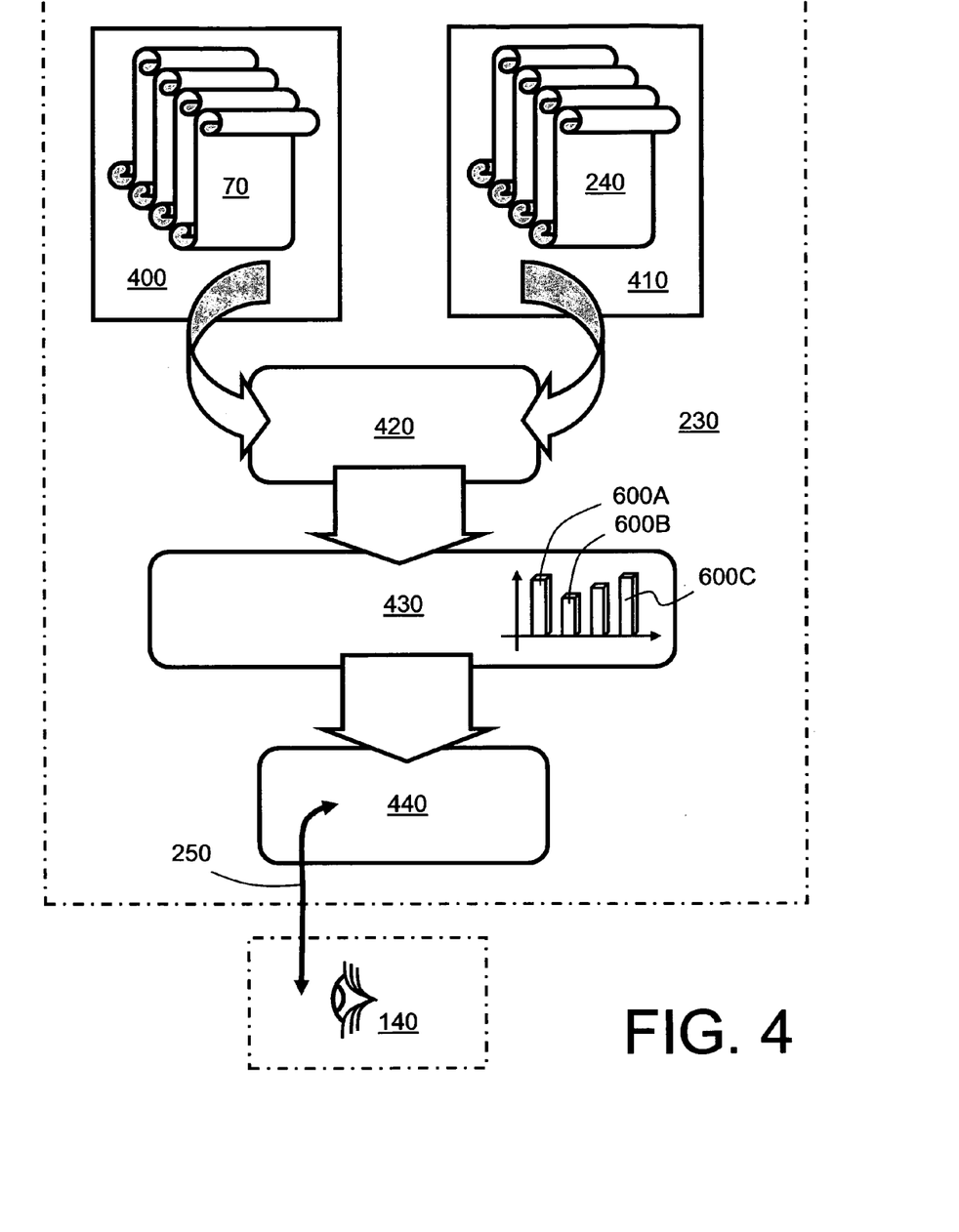
FIG. 4 is a flow chart of processing steps implemented in an Internet server site implementing the system of FIG. 2 and FIG. 3.
Figure 5:
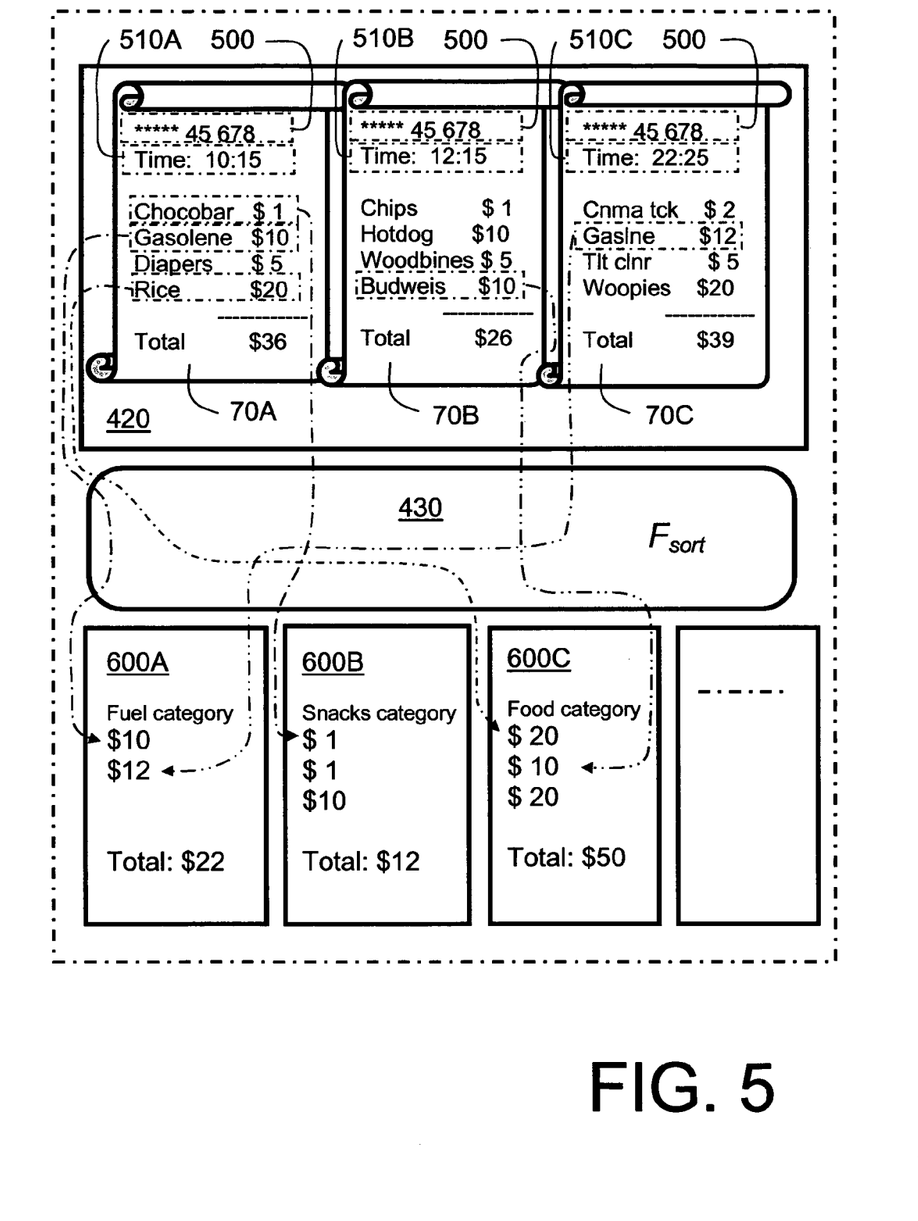
FIG. 5 is a schematic illustration of category sorting occurring within the systems of FIG. 2 and FIG. 3.

Referring to FIG. 4 and FIG. 5, the one or more software applications at the web site 230 are operable to pair document files 400 corresponding to the receipts 70 with record files 410 supplied in the data stream via the data link 240 from the banking establishment 100; such pairing represented by step 420 in FIG. 4 is described in the foregoing based upon a comparison of at least a part of a bank account number, time of transaction and/or a total amount of transaction. For each owner 140 registered with the web site 230 and having provided permission for the web site 230 to be furnished with financial data regarding the owner 140 from the banking establishment 100, the web site 230 is able to provide the owner 140, namely user, with the receipts 70 corresponding to financial transactions of the owner 140 organized in a structured manner, for example as required for accounting purposes and computation of tax. Such operation is able to assist the owner automatically prepare detailed accounts for taxation purposes which would formerly have required considerable expensive clerical effort.

Moreover, the one or more software applications beneficially include a sorting step 430 which performs matching between items listed on receipts 70 identified in respect of a given owner 140 subscribing to the web site 230. The sorting step 430 involves matching entries E on receipts 70 against a vocabulary of acronyms and abbreviations corresponding to classifications K. The classifications K for sorting and presenting analysis results to the owner 140 can be defined by the owner 140 when interacting with the web site 230. Optionally, certain categories K can be combined together for analysis purposes and/or presentation purposes, for example snacks as one category K1 and food as another category K2 can be considered together as a grouped composite category known as nutritional products K1,2.

Each category K beneficially has a pre-defined group of acronyms and abbreviations which can be matched with entries on the receipts 70. Optionally, the owner 140, namely user, can add additional acronyms and abbreviations to develop and/or refine selectivity of matching the categories to entries in the receipts 70. Matching is either optionally performed in a precise exactly equivalent manner, or in a fuzzy manner of there being a match when the first letter precisely correspond together with subsequent letter corresponding when more than a proportion L of letters being present correspond, wherein L is in a range of 0 to 1, more preferable in a range 0.8 to 1.0, and most preferably in a range 0.9 to 1.0. Such a manner of comparison takes into account that certain retailing organisations abbreviate names for their products depending upon personnel whim. Optionally, the categories K take into account diverse foreign languages, for example Chinese and Norwegian, for example in an event of Norwegian oil entrepreneurs travelling to China to meet Chinese oil experts for discussions, and then subsequently having to prepare accounts for taxation purposes or invoicing purposes.

Referring to FIG. 5, there are shown three receipts 70A, 70B, 70C communicated via the card reader 30A and its associated cash register 30B and the module 210 via the data link 220 to the web site 230. Each receipt 70A, 70B, 70C includes at least a subset of digits denoted by 500 of the owner's bank account; as illustrated, the receipts 70A, 70B, 70C are identical in respect of this subset of digits 500. Moreover, the receipts 70A, 70B, 70C also include a character field 510A, 510B, 510C indicative of when the financial transactions corresponding to the receipts 70A, 70B, 70C respectively. In the pairing step 420 whereat a sorting function $F_{sort}$ is performed, the receipts 70A, 70B, 70C are identified against the given owner 140 and sums of money associated with their individual items sorted into categories 600A (Fuel category), 600B (Snacks category), 600C (Food category) in a manner as illustrated. The categories 600 are then presented to the owner 140 as a pie-chart, bar-graph or graph format, the owner 140 being coupled via Internet to the web site 230. The owner 140, namely user, can define results of receipts 70 within a given time interval being presented, for example purchases made during the past year, past month or past week. Optionally, the owner 140 can predefine budget limits for each category K, for example within a monthly interval, so that the web site 230 is operable to send a reminder message, for example via short messaging system (SMS), when the owner 140 has exceeded a given consumption limit for a given category K. Such SMS warning enables the owner 140, namely user, to economize in financially difficult circumstances. The invention thereby provides a warning apparatus to provide the owner 140, namely user, with an indication, for example SMS reminder, when the owner 140 is not behaving within certain pre-defined economic constraints, for example using a vehicle too much resulting in excessive purchase of gasoline (petrol). With burgeoning World population and diminishing natural resources, whereas the World has experienced a relentless economic growth in a period from the year 1900 to the year 2005, namely to a temporal point of "peak oil", many economic experts believe that after the year 2005, the World has entered a period of continual real economic decline. After the year 2005, average resources per person alive will decrease with time, requiring increasingly strenuous efforts to increase resource use efficiency, to economize and to reduce personal consumption. Only a drastic reduction in World population and/or a paradigm shift in energy production technology are perceived to be solutions to this forthcoming permanent economic decline generally within the World.

Optionally, the web site 230 allows the owner 140, namely user, to introduce additional data corresponding to other types of debits from the owner's account that do not generate corresponding receipts 70, for example banks transfers of sums of money to foreign bank accounts. Debits from the owner's account communicated from the banking establishment 100 to the web site 230 which do not have corresponding receipts 70 are beneficially placed in a miscellaneous category for presenting in various types of trend analysis provided at the web site 230.

The owner 140 is able to access the web site 230 using a personal computer, a mobile telephone provide with a web browser, a personal digital assistant (PDA) provided with a web browser. The owner 140 of the card 20 is able to plan his/her expenditure which is especially relevant in economically difficult times. The famous contemporary financier George Soros is quoted to have said that the past 30 years has been a financial super-bubble which is now bursting as human society passes "peak oil", namely where demand for oil exceeds available supply of oil. Severe economic times will persist many years into the future until alternative energy sources are found to replace oil; such severe economic conjuncture renders the present invention highly relevant for many years to come.

The system 200 enables owners 140, namely users, to plan their expenditure more appropriately, for example in austere financial circumstances. Moreover, the system 200 enables owners 140 to focus their financial resources into areas of expenditure into activities which are beneficial and/or essential.

The system 200 has many potential uses. For example, the system 200 is able potentially to determine consumption of a given class of product in respect of geographical region and/or time of year; such information can be potentially of benefit to suppliers to control their inventory of products for sale, thereby improving efficiency of distribution. As a further example, the system 200 can be used for automatic inventory purchasing. The system 200 is also beneficially used as a tool for collating statistics regarding financial transactions implemented using credit cards and/or debit cards without divulging details regarding specific users.

In an embodiment of the system 200, the web site 230 is accessible to parties other than the owner 140 for obtaining various analyses in respect of sale of types of products, for example in respect of geographical region and/or time of year. Owners of premises, for example shops, supermarkets, gas stations, railway stations, airports and such like, whereat the card reader 30A and its associated module 210 are installed are beneficially able via the web site 230 to control a degree of dissemination and analysis applied to data generated when the owner 140 utilizes his/her card 20 for making payments; for example, such control may be exercised by way of a communication portal provided at the web-site 230 and/or by way of a legally-binding contract arranged between the operator of the system 200 and owners of the premises whereat the card reader 30A and its associated module 210 are installed.

For example, third parties optionally pay a subscription to the operator of the web site 230 for being provided with aggregate analysis data regarding sales of certain categories of products. Individual owner's purchasing habits and identity are not discernible from the aggregate analysis data, thereby safeguarding privacy of the owner 140. The third parties are beneficially marketing organisations, consumer advisory agencies, government planning departments, manufacturers of products, distributors of products, service companies, utility companies and so forth. Thus, the system 200 is able to provide a valuable budget analysis service to the owners 140 of the cards 20, as well as a valuable tool for providing aggregate data anonymously to third parties such that privacy and confidentiality in respect of individual owners 140 is ensured.

Owners of premises whereat the card readers 30A and their associated modules 120 are installed are beneficially provided with various benefits by cooperating to assist in the system 200 being established. For example, the owners of premises optionally is provided with free aggregate information which allows the owners of the premises to plan better their restocking arrangements, and have a better overview regarding their profitability. Moreover, in premises where large accumulations of cash can occur, the system 200 is able to arrange for automatic collection of the cash; in such case, beneficially all receipts 70 generated in respect of both card 30 purchases and cash purchases are recorded by the system 200 and used for data analysis, and aggregate data services provided from the web site 230.

The present invention utilizes unique hardware, namely the module 210, 300, uses software executing on computing hardware and involves processing data generated against a physical entity of a credit card or debit card with magnetic data strip and/or integrated silicon chip. The invention relates to real hardware and real information systems and is thus not an abstract theoretical concept.

Referring to FIG. 6, the system 200 is illustrated as a retrofit arrangement for existing cash registers 30B. The cash register 30B in FIG. 6 includes a card reader 30A for receiving and subsequently reading a card 20 of a user 140, a keyboard 40 for PIN code entry, a printer 60 for printing out receipts 70, and a display 800 for presenting text and/or numerical data to the user 140. The cash register 30B is beneficially coupled to an optical laser scanner 805 for reading bar codes printed onto products to be purchased. The cash register 30B also includes a data processing unit 810 which is coupled to the card reader 30A, to the keyboard 40, to the display 800 and to the printer 60. Moreover, the system 200 includes a cradle 820 for receiving a rear lower end of the cash register 30B. The cradle 820 includes an elongate supporting member 830 whose first end is attached to the cradle 820 and whose second end supports a display 840 which is presented to the user 140 when the user 140 is at a time when he/she is to execute a financial transaction in respect of his/her credit card 20. The cradle 820 also includes an optical sensor for scanning one or more receipts 70 as they are printed by the printer and/or a connection for receiving a symbol drive signal, for example in RS232 format, employed to drive to printer 60 in operation. Optionally, the cash register 30B and the cradle 820 are installed at a checkout desk in retailing premises. Optionally, a further subsidiary display associated with the cradle 820 is provided downstream in respect of a flow of paying users 140, namely customers, so that the users 140 can be presented with additional information after completing their purchase whilst packing their merchandise for carrying away from the retailing premises. The subsidiary display can, for example, be coupled to the cradle 820 via flexible lead and/or by near-field wireless communication such as Bluetooth.

The cash register 30B is coupled via an ISDN link 850 and associated communication network 860 to the banking establishment 100. By authorization from the user 140, the banking establishment 100 provides account debit information to the web site 230 as illustrated. In parallel, the cradle 820 is coupled via an Internet link 880 through the Internet 870 to the web site 230, and the web site 230 is coupled via the Internet 870 to the display 840. The Internet links 880, 890 correspond to the aforementioned "Duotube", namely a bi-directional data exchange path. Optionally, the display 840 has associated therewith a touch screen facility for tactile input of numerical or alphanumerical data and/or a card reader for reading the credit card 20, Optionally, the cradle 820 includes a data buffer 215 for buffering data as will be described in more detail later.

The system 200 as illustrated in FIG. 6 potentially provides multiple synergistic benefits. From a viewpoint of a proprietor of retailing premises, the cradle 820 can be installed with minimal disruption, for example effectively as an immediate plug-in retrofit taking only minutes to render functional. In one practical application of the present invention, the cradle 820 is installed at all check-out terminals, for example indicated by 900 in FIG. 7, at retailing premises of a retailing facility. In an event that a given customer is not a registered member of the system 200, the given customer can pay for their merchandise using their credit card 20 via the cash register 30B in a conventional manner. In contradistinction, when the given customer corresponds to the user 140 who is a registered user of the system 200 in FIG. 6, the user 140 when approaching the cash register 30B inputs their personal code, namely previously allocated by the web site 230 to the user 140, at the touch screen 840 and/or swipes their credit card 20 at a card reader associated with the cradle 820, before interacting with the cash register 30B for paying for goods 910 to be purchased. The cradle 820 is operable via the Duotube 880, 890 to communicate an identity of the user 140 to the web site 230. In response, the web site 230 checks against its records for the user 140 regarding a type of information the user 140 is desirous to have available at a time of purchase, for example one or more of:

(i) present bank account balance of the user 140;
(ii) profile of monthly purchasing patterns for different types of goods previously purchased by the user 140, for example the user 140 is spending too much for a given month on alcoholic beverages and must execute more abstemious behavior; and (iii) special offers available at the retailing premises and/or special promotions of products, such offers being specifically targeted at the taste of the user 140 as determined by user data held at the web site 230.

Figure 7:
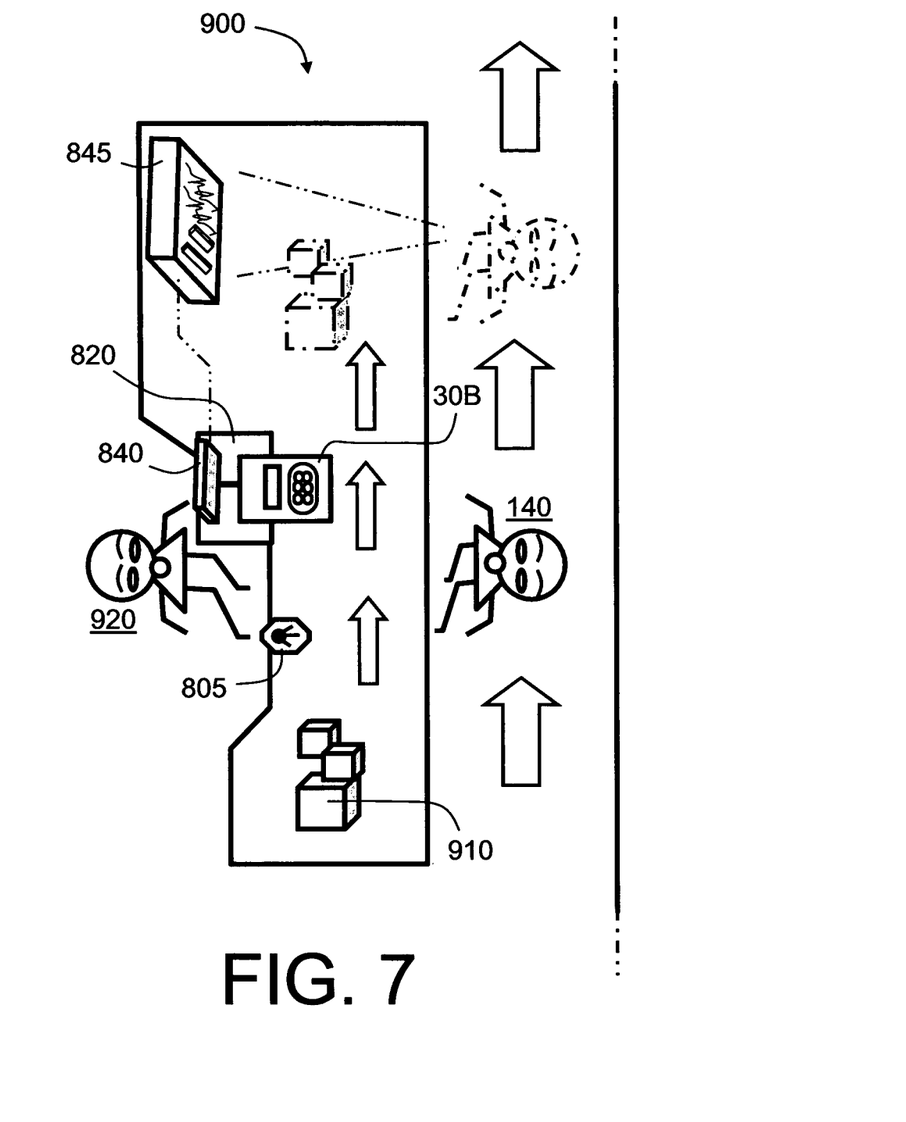
FIG. 7 is an illustration of retailing premises whereat the system of FIG. 6 is employed.

When the user 140 decides to purchase the merchandise 910, the user 140 indicates to a cashier 920 a desire to proceed. The cashier 820 then proceeds to use the laser scanner 805 to read bar codes included on outer surfaces of the products 910. When the products 910 have all had their bar codes scanned, the cashier 920 then shows the user 140 a total price for the merchandise 910 on a display 800 of the cash register 30B. In an event that the user 140 is desirable to purchase the merchandise 910 on a basis of the total price presented on the display 800, the user 140 inserts his/her credit card 20 into the card reader 30A of the cash register 30B, after which the user 140 enters their PIN code into the keyboard 40 of the cash register 30B. The cash register 30B then communicates in a conventional manner with the banking establishment 100 to cause the bank account of the user 140 to be appropriately debited for the merchandise 910. The cash register 30B then sends signals to the printer 60 of the cash register 60 to print out a corresponding receipt 70. The cradle 820 optically scans the receipt 70 as it is printed and/or is coupled to intercept the signal driving the printer 60 to provide a corresponding stream of data via the Duotube 880, 890 to the web-site 230. Subsequently, the web-site 230 executes software products to match bank statement information from the banking establishment 100 with data present on the receipt 70 in a manner as described in the foregoing. The details of the user 140 are then updated at the web site 230.

As the user 140 moves along the checkout counter 900, the subsidiary display 845 can present information, for example advertisements, specifically adapted to the user 410 on account of the web site 230 being aware of the user 410 being in a vicinity of the subsidiary display 845 when packing the purchased merchandise 910 into carry bags and similar. Such a manner of operation is capable of ensuring effective and targeted advertising in respect of the user 140. Yet alternatively, information presented on the subsidiary display 140 can be customized to the user 140 to give him/her a personalized exclamation of having made purchases at the retailing establishment, thereby making the user 140 more inclined to revisit the retailing establishment again in future. Thus, the present invention is susceptible to provide benefits for both the user 410 as well as the retailer responsible for the checkout counter 900.

Optionally, the cradle 820 and its associated facilities are integrated into a design of the cash register 30B to provide an integral apparatus with synergistically enhanced functionality. Other options are possible, including one or more of:

(i) inclusion of voice synthesis so that the cradle 820 provides voice feedback; this is of benefit to people with impaired eyesight, for example being informed orally regarding their bank balance before executing a purchase;

(ii) inclusion of a biometric identification arrangement so that presence of the user 410 at the cash register 30B with its associated cradle 820 is identified by biometric measurement, for example finger print analysis, facial feature details identified using an optical camera sensor;

(iii) inclusion of voice capture apparatus for confirming identity of the user 410 by analyzing speech utterances of the user 410.

Modifications to embodiments of the invention described in the foregoing are possible without departing from the scope of the invention as defined by the accompanying claims.

Expressions such as "including", "comprising", "incorporating", "consisting of", "have", "is" used to describe and claim the present invention are intended to be construed in a non-exclusive manner, namely allowing for items, components or elements not explicitly described also to be present. Reference to the singular is also to be construed to relate to the plural.

Numerals included within parentheses in the accompanying claims are intended to assist understanding of the claims and should not be construed in any way to limit subject matter claimed by these claims.

The invention claimed is:

1. A system for monitoring commercial transactions implemented using one or more credit cards and/or debit cards in conjunction with one or more card readers and/or their associated cash registers linked in communication to a banking establishment, the system comprising:
   one or more modules for use with one of more printers of the one or more card readers and/or their associated cash registers for communicating information included in receipts generated in response to transactions occurring in respect of the one or more credit cards and/or debit cards executed at the one or more card readers; and
   computing hardware for executing in operation one or more software products for receiving information included in said receipts, for receiving from said banking establishment account information regarding one or more owners or users of said one or more credit cards and/or debit cards, and for associating information included within the receipts with the account information to generate a detailed itemized report of individual items provided in the receipts for presentation to said one or more owners or users;
   wherein said computing hardware is operable to associate said information included in said receipts with said account information by:
   comparing a subset of account identification digits included in said receipts with account numbers included in said account information; and
   at least one of:
   comparing times of transaction recorded on said receipts with time records present in said account information; and
   comparing total amounts debited for each transaction as recorded on said receipts and also present in said account information.

2. A system as claimed in claim 1, wherein said one or more modules are adapted to be connected between said one or more card readers and/or their associated cash registers and their one or more associated printers.

3. A system as claimed in claim 1, wherein the one or more modules are adapted to be integral to the one or more card readers and/or their associated one or more cash registers and/or their associated one or more printers.

4. A system as claimed in claim 1, wherein said one or more modules are operable to generate said information included in said receipts for communicating to said computing hardware by optically imaging paper receipt documents printed by said printer.

5. A system as claimed in claim 1, wherein said detailed itemized report of individual items provided in the receipts for presentation to said one or more owners or users includes the individual items allocated to one or more categories of items.

6. A system as claimed in claim 5, wherein said system is operable to provide said itemized report relating to a defined time interval in which said receipts were generated.

7. A system as claimed in claim 1, wherein said computing hardware is provided by way of a web server linked to the Internet.

8. A system as claimed in claim 1, wherein said system includes a cradle couplable with said cash register, wherein said cradle is couplable to said computing hardware via a bi-direction communication link for enabling a display arrangement to provide information pertinent to said or more owners or user when executing one or more financial transactions using the system.

9. A system as claimed in claim 8, wherein said cradle includes a detection arrangement for determining an identity of the one or more owners or users.

10. A method of using a system to monitor commercial transactions implemented using one or more credit cards and/or debit cards in conjunction with one or more card readers and/or their associated cash registers linked in communication to a banking establishment, the method comprising:

communicating information included in receipts using one or more modules, said one or more modules being adapted for use with one of more printers of the one or more card readers and/or their associated cash registers, said receipts being generated in response to transactions occurring in respect of the one or more credit cards and/or debit cards executed at the one or more card readers; and using computing hardware executing in operation one or more software products to receive information included in said receipts, to receive from said banking establishment account information regarding one or more owners or users of said one or more credit cards and/or debit cards, and to associate information included within the receipts with the account information to generate a detailed itemized report of individual items provided in the receipts for presentation to said one or more owners or users;

wherein said computing hardware is operable to associate said information included in said receipts with said account information by:

comparing a subset of account identification digits included in said receipts with account numbers included in said account information; and at least one of:

comparing times of transaction recorded on said receipts with time records present in said account information; and comparing total amounts debited for each transaction as recorded on said receipts and also present in said account information.

11. A method as claimed in claim 10, wherein said one or more modules are adapted to be connected between said one or more card readers and/or their associated cash registers and their associated one or more printers.

12. A method as claimed in claim 10, wherein the one or more modules are adapted to be integral to the one or more card readers and/or their associated one or more cash registers and/or their associated one or more printers.

13. A method as claimed in claim 10, wherein said one or more modules are operable to generate said information included in said receipts for communicating to said computing hardware by optically imaging paper receipt documents printed by said printer.

14. A method as claimed in claim 10, wherein said detailed itemized report of individual items provided in the receipts for presentation to said one or more owners or users includes the individual items allocated to one or more categories of items.

15. A method as claimed in claim 14, wherein said system is operable to provide said itemized report relating to a defined time interval in which said receipts were generated.

16. A method as claimed in claim 10, wherein said computing hardware is provided by way of a web server linked to the Internet.

17. A module for connecting in a data stream between a card reader and its associated printer for receiving receipt information and sending said receipt information via a data link to computing hardware remote from the card reader and/or its associated cash register, said module being adapted for implementing a method as claimed in claim 10.

18. A module as claimed in claim 17, wherein the module is adapted to be a cradle for coupling to said cash register, wherein said cradle is provided with a bi-directional communication link to said computing hardware, and wherein said cradle includes a display arrangement for presenting information personalized to the one or more owners or users when utilizing the cash register to make payment.

19. A module for use with a card reader and its associated printer for receiving receipt information by optically scanning printed receipts and sending said receipt information via a data link to computing hardware remote from the card reader and/or its associated cash register, said module being adapted for implementing a method as claimed in claim 10.

20. A software product recorded on a machine readable medium, said software product being executable upon computing hardware for implementing a method as claimed in claim 10.

* * * * *